United States Patent
Munukur et al.

(10) Patent No.: US 8,228,035 B2
(45) Date of Patent: Jul. 24, 2012

(54) REGENERATION CAPACITY CONTROL METHOD FOR A BATTERY

(75) Inventors: Rama Munukur, Hillsboro, OR (US); Goro Tamai, West Bloomfield, MI (US); Ahmad M Bazzi, Dearborn, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 439 days.

(21) Appl. No.: 12/474,697

(22) Filed: May 29, 2009

(65) Prior Publication Data

US 2010/0301867 A1    Dec. 2, 2010

(51) Int. Cl.
    H02J 7/00    (2006.01)
(52) U.S. Cl. .......................... 320/132; 320/134
(58) Field of Classification Search ........................ None
    See application file for complete search history.

(56) References Cited

U.S. PATENT DOCUMENTS

| | | | | |
|---|---|---|---|---|
| 5,959,420 | A * | 9/1999 | Boberg et al. | 318/432 |
| 7,039,150 | B1 * | 5/2006 | Drori | 320/137 |
| 2003/0230440 | A1 * | 12/2003 | Kamen et al. | 180/65.2 |
| 2007/0145954 | A1 * | 6/2007 | Kawahara et al. | 320/150 |
| 2008/0042615 | A1 | 2/2008 | Serrels et al. | |
| 2008/0170340 | A1 * | 7/2008 | Roehm et al. | 361/31 |

\* cited by examiner

*Primary Examiner* — Melissa Koval
*Assistant Examiner* — Robert Grant
(74) *Attorney, Agent, or Firm* — Quinn Law Group, PLLC

(57) ABSTRACT

A method for controlling regeneration of a battery includes determining a scaled value for a state of charge of the battery, a scaled value for a battery temperature and a scaled value for a maximum charging power of the battery. An actual battery temperature is then compared with a predetermined operating temperature. When the actual battery temperature is less than the predetermined operating temperature, an actual regeneration amount is calculated based upon the scaled value for the state of charge of the battery and the scaled value for the battery temperature. When the actual battery temperature is greater than the predetermined operating temperature, the actual regeneration amount is based upon the scaled value for the state of charge of the battery, the scaled value for the battery temperature, and the scaled value for the maximum charging power of the battery.

12 Claims, 2 Drawing Sheets

REGENERATION CAPACITY CONTROL METHOD FOR A BATTERY

TECHNICAL FIELD

The present invention relates, generally, to a vehicle having an electrically variable transmission, and more specifically, to system for controlling regeneration of a battery for the electrically variable transmission.

BACKGROUND OF THE INVENTION

Vehicles with electrically variable transmissions are commonly driven in part by the transmission including the associated battery and motor/generators. Excess energy from the vehicle is used to regenerate the stored power of the battery. For example, the energy dissipated during braking is used to regenerate the battery charge.

However, recharging a battery too quickly may have undesirable side effects, such as increasing the battery temperature above a desired operational range and overcharging the battery. Overcharging the battery may result in uneven drive of the vehicle and decreased fuel efficiency. Often, the battery can act as a buffer during the recharging to maintain an even drive effect on the vehicle. However, if the battery is already near capacity or hot, the recharging of the battery may occur too quickly for the battery to provide a buffering effect. This especially occurs during events that create large amounts of power for recharging the battery, such as braking. The desired amount of regeneration of the battery depends on several factors including the temperature of the battery, the current amount of charge stored by the battery, and the amount of charging power available at a given time.

SUMMARY OF THE INVENTION

A method for determining regeneration capacity for a battery for an electrically variable transmission is provided. A method for controlling the regeneration of the battery includes determining a scaled value for a state of charge of the battery and determining a scaled value for a battery temperature. A scaled value for a maximum charging power of the battery may also be determined.

An actual battery temperature is then compared with a predetermined operating temperature. When the actual battery temperature is less than the predetermined operating temperature, than an actual regeneration amount is calculated based upon the scaled values for the state of charge of the battery and the battery temperature. When the actual battery temperature is greater than the predetermined operating temperature, the actual regeneration amount is based upon the scaled values for the state of charge of the battery, the battery temperature, and the maximum charging power of the battery.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
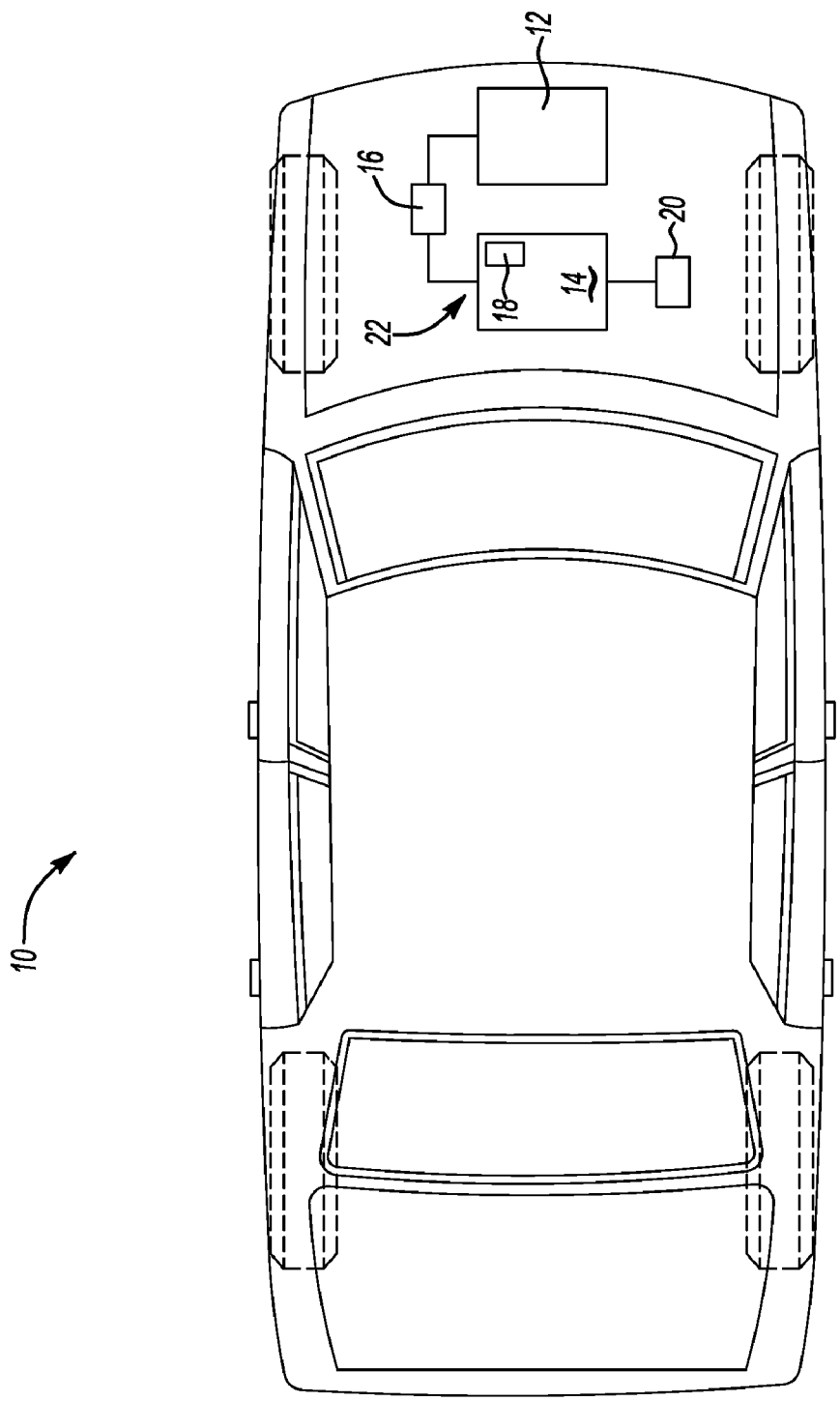
FIG. 1 is a schematic illustration of a vehicle having an electrically variable transmission and a regeneration control system.

Referring to the Figures, wherein like reference numbers refer to the same or similar components throughout the several views, FIG. 1 schematically illustrates a vehicle 10 including an engine 12 and an electrically variable transmission 14. An electronic control unit (ECU) 16 is connected to the engine 12 and the transmission 14 for controlling operation of the engine 12 and the transmission 14.

The transmission 14 includes at least one motor/generator 18 and a battery 20. A regeneration control system 22 includes the transmission 14, the ECU 16, the battery 20 and may also include other components (not shown) of the vehicle 10 which provide charging power for the battery 20. To prevent overcharging of the battery 20 the regeneration control system 22 calculates the actual regeneration ($R_{ACT}$) amount that is desired with a given set of vehicle 10 operating conditions. The amount of actual regeneration ($R_{ACT}$) for the battery 20 depends on several factors including, but not limited to, the actual temperature of the battery 20, the current state of charge (SOC) of the battery 20, and the maximum charging power ($P_{MAX}$) of the battery 20. As part of regeneration control system 22, the ECU 16 may perform the necessary calculations required to determine the actual regeneration ($R_{ACT}$) amount for the battery 20 and collect the necessary data from the various vehicle 10 components.

Figure 2:
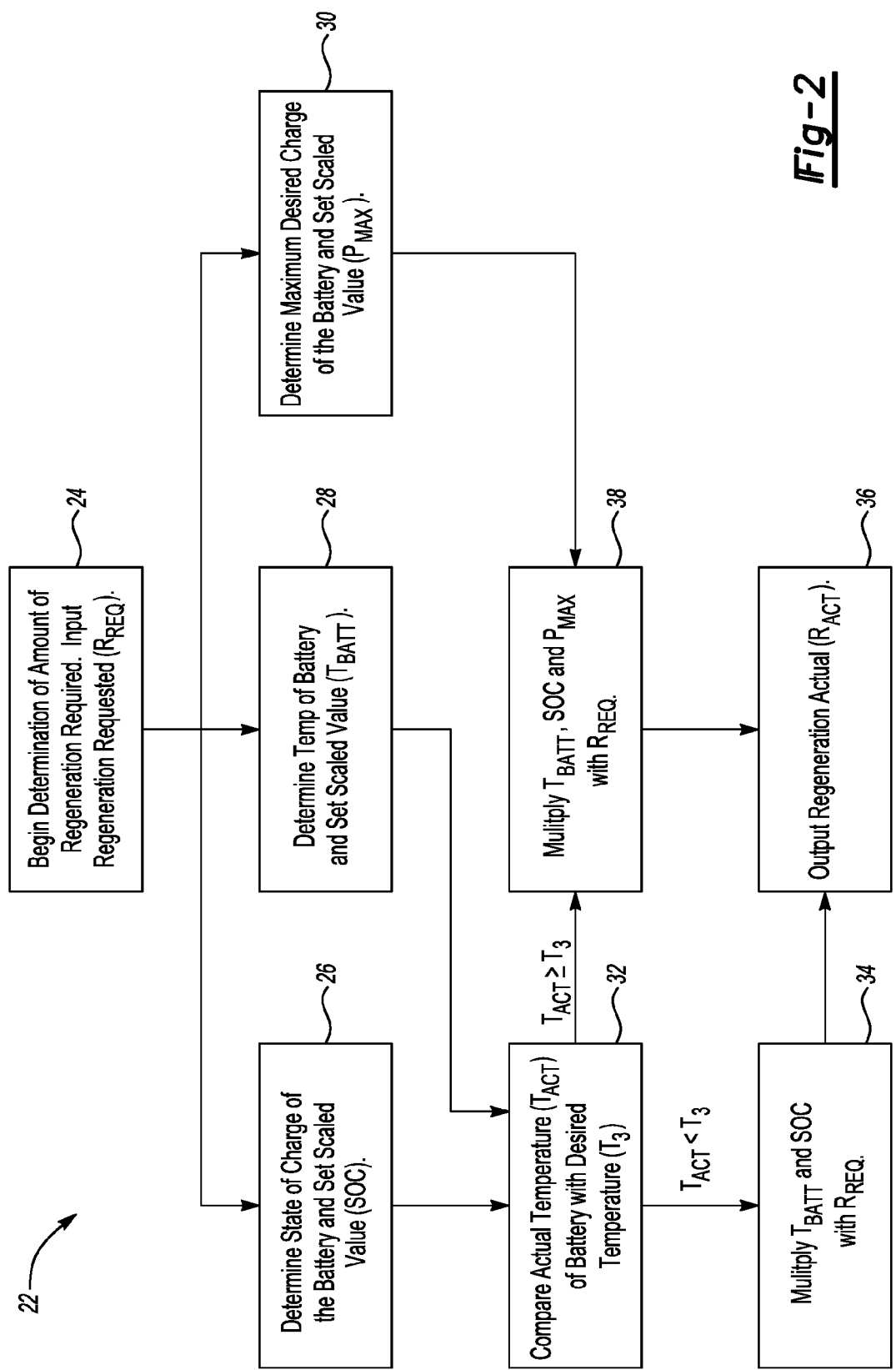
FIG. 2 is a schematic illustration of the method for determining an actual regeneration value with the regeneration control system of FIG. 1.

Referring to FIGS. 1 and 2, the regeneration control system 22 is discussed in further detail. During operation of the vehicle 10, a request is sent to the regeneration control system 22 to determine an amount for battery regeneration, step 24. The request to determine the actual regeneration ($R_{ACT}$) amount of the battery 20 includes a requested regeneration ($R_{REQ}$) value. The requested regeneration ($R_{REQ}$) is based on the amount of power available to send to the battery 20. The requested regeneration ($R_{REQ}$) value is related to the power provided for the battery 20 from various vehicle 10 components and functions and is unrelated to the current conditions of the battery 20.

The regeneration control system 22 collects data from the various vehicle 10 components including determining a scaled value for a state of charge (SOC) of the battery 20, step 26. The actual state of charge ($SOC_{ACT}$) of the battery 20 is a percentage of the actual battery 20 charge compared with the total battery 20 charge capacity. The scaled value state of charge (SOC) is a value between 0 and 1 that is proportional to the actual state of charge ($SOC_{ACT}$) contained by the battery 20 at that time.

The state of charge (SOC) of the battery 20 has an ideal operating range which minimally provides sufficient charge for the various demands on the battery 20 by the vehicle 10, while protecting the battery 20 from overcharging. However, the battery may operate outside the "ideal" operating range. Therefore, the battery 20 has an acceptable operating range in which some regeneration to no regeneration of the battery 20 will be desired. Therefore, a predetermined minimum state of charge ($S_1$) is set as a minimal acceptable percentage of the battery charge compared with the total battery 20 charge capacity, at which charge should still be added to the battery 20 at the full regeneration rate. Below the predetermined minimum state of charge it is acceptable and desired to charge the battery 20 with the full available regeneration power. Additionally, a predetermined maximum state of charge ($S_2$) is set as a maximum desired percentage of the battery charge compared with the total battery 20 charge capacity. For example, the ideal state of charge (SOC) of the battery 20 is a range of 50-70%. The desired minimum state of charge ($S_1$)

for the regeneration capacity control is set at 70% and the desired maximum state of charge ($S_2$) is set at 75%. When the battery 20 is at 70% that battery is at the minimum of an acceptable range for adding any charge to the battery 20. When the battery has reached and an actual state of charge ($SOC_{ACT}$) of 75% the battery is at the outside limit of the acceptable range and charge of the battery 20 is not desired. Other ranges for the acceptable state of charge (SOC) may be set. One skilled in the art would know the proper range for the acceptable state of charge (SOC) based upon a particular vehicle 10 and battery 20 combination.

The following is an example for setting the scaled value state of charge (SOC). The actual state of charge ($SOC_{ACT}$) of the battery 20 is measured. If the actual state of charge ($SOC_{ACT}$) is less than or equal to the predetermined minimum state of charge ($S_1$) the scaled value state of charge (SOC) is set equal to 1. This is represented by the equation: $SOC_{ACT} \leq S_1$ then the scaled value SOC=1. If the actual state of charge ($SOC_{ACT}$) is greater than or equal to a predetermined maximum state of charge ($S_2$) the scaled value state of charge (SOC) is set equal to 0. This is represented by the equation: $SOC_{ACT} \geq S_2$ then the scaled value SOC=0. Finally, if the actual state of charge ($SOC_{ACT}$) of the battery 20 is between the predetermined minimum state of charge ($S_1$) and the predetermined maximum state of charge ($S_2$) then the scaled value state of charge (SOC) is set as a proportion using the following equation: $S_1 < SOC_{ACT} < S_2$ then $SOC=(S_2-SOC_{ACT})/(S_2-S_1)$.

The regeneration control system 22 also determines a scaled value for the battery 20 temperature ($T_{BATT}$), step 26. The actual temperature ($T_{ACT}$) of the battery 20 is measured. The scaled value temperature ($T_{BATT}$) of the battery 20 is a value between 0 and 1 that is proportional to the actual temperature ($T_{ACT}$) of the battery 20 at that time.

The temperature ($T_{BATT}$) of the battery 20 has an ideal operating range that provides a minimal temperature for optimal performance of the battery 20 and a maximum temperature that protects the battery 20 from overheating. However, the battery may operate outside the "ideal" temperature range. Therefore, the battery 20 has an acceptable operating range in which some regeneration to no regeneration of the battery 20 will be desired. Therefore, a predetermined minimum battery 20 temperature ($T_1$) is set as the minimum for the acceptable operating range for directing regeneration power to the battery 20. Additionally, a predetermined maximum battery 20 temperature ($T_2$) is set. For example, the ideal temperature ($T_{BATT}$) of the battery 20 is a range of 20-40 degrees Celsius. The desired minimum battery temperature ($T_1$) is set at 40 degrees Celsius and the desired maximum battery temperature ($T_2$) is set at 45 degrees Celsius. When the battery 20 is at 40 degrees Celsius the battery 20 is at the minimum of an acceptable range for adding any charge to the battery 20. When the battery has reached 45 degrees Celsius the battery 20 is at the outside limit of the acceptable range and charge the battery 20 is not desired Other ranges for the acceptable battery temperature ($T_{BATT}$) may be set. One skilled in the art would know the proper range for the temperature ($T_{BATT}$) of the battery 20 based upon a particular vehicle 10 and battery 20 combination.

The following is an example for setting the scaled value temperature ($T_{BATT}$) for the battery 20. The actual temperature ($T_{ACT}$) of the battery 20 is measured. If the actual temperature ($T_{ACT}$) is less than or equal to the predetermined minimum temperature ($T_1$) the scaled value temperature ($T_{BATT}$) for the battery 20 is set equal to 1. This is represented by the equation: $T_{ACT} \leq T_1$ then $T_{BATT}=1$. If the actual temperature ($T_{ACT}$) is greater than or equal to the predetermined maximum temperature ($T_2$) then the scaled value temperature ($T_{BATT}$) for the battery 20 is set equal to 0. This is represented by the equation: $T_{ACT} \geq T_2$ then $T_{BATT}=0$. Finally, if the actual temperature ($T_{ACT}$) of the battery 20 is between the values of $T_1$ and $T_2$ the scaled value temperature ($T_{BATT}$) for the battery 20 is set as a proportion using the following equation: $T_1 < T_{ACT} < T_2$ then $T_{BATT}=(T_2-T_{ACT})/(T_2-T_1)$.

The regeneration control system 22 also determines a scaled value for a maximum charging power ($P_{MAX}$) for charging the battery 20, step 30. The maximum charging power ($P_{MAX}$) is the maximum amount of power that should be applied when charging the battery 20. The actual charging power ($P_{ACT}$) available for charging the battery 20 is measured. The scaled value maximum charging power ($P_{MAX}$) is a value between 0 and 1 that is proportional to actual power ($P_{ACT}$) for charging the battery 20 that is available at that time.

The ideal maximum charging power ($P_{MAX}$) of the battery 20 is a range that provides sufficient charging power to quickly charge the battery 20, while protecting the battery 20 from charging too quickly and overheating or overcharging. When the maximum charging power ($P_{MAX}$) capability of the battery 20 is low this can result in drive quality problems during braking transitions and transmission shifts. Therefore, a predetermined minimum charging power ($P_1$) is set as a minimally desired charging power compared with the total charging power capacity of the battery 20. Anything below the minimum charging power ($P_1$) will be charge with the maximum charging power ($P_{MAX}$) capability. Additionally, a predetermined desired maximum charging power ($P_2$) is set as a maximum desired charging power compared with the total charging power capacity of the battery 20. For example, the ideal maximum charging power ($P_{MAX}$) of the battery 20 is a range between 5-10 kilowatts. The predetermined minimum charging power ($P_1$) is set at 5 kilowatts and the predetermined maximum charging power ($P_2$) is set at 10 kilowatts. Other ranges for the ideal maximum charging power ($P_{MAX}$) may be set. One skilled in the art would know the proper range for the ideal maximum charging power ($P_{MAX}$) based upon a particular vehicle 10 and battery 20 combination.

The following is an example for setting the scaled value maximum charging power ($P_{MAX}$). The actual charging power ($P_{ACT}$) available is measured. The actual charging power ($P_{ACT}$) is a negative value. Therefore, if the absolute value of the actual charging power ($P_{ACT}$) is less than or equal to the predetermined minimum power charge ($P_1$) the scaled value maximum charging power ($P_{MAX}$) is equal to 1. This is represented by the equation: $P_{ACT} \geq P_1$ then $P_{MAX}=1$. If the absolute value of the actual charging power ($P_{ACT}$) is greater than or equal to the predetermined maximum power charge ($P_2$) the scaled value maximum charging power ($P_{MAX}$) is equal to 0. This is represented by the equation: $P_{ACT} \leq P_2$ then $P_{MAX}=0$. Finally, if the actual charging power ($P_{ACT}$) of the battery 20 is between the values of the predetermined minimum charging power ($P_1$) and predetermined maximum charging power ($P_2$) the scaled value maximum charging power ($P_{MAX}$) is set as a proportion using the following equation: $P_1 > P_{ACT} > P_2$ then $P_{BATT}=(P_2-P_{ACT})/(P_2-P_1)$.

Once the regeneration control system 22 has determined the scaled value state of charge (SOC) at step 26, the scaled value battery temperature ($T_{BATT}$) at step 28, and the scaled value maximum charging power ($P_{MAX}$) at step 30, then the system 22 compares the actual temperature ($T_{ACT}$) of the battery 20 with an operating temperature ($T_3$) of the battery 20, at step 32. The operating temperature ($T_3$) of the battery 20 is the minimal operating temperature for the battery 20. The operating temperature ($T_3$) of the battery 20 is located well below the acceptable performance range of the battery

20 that is set by the minimum operating temperature ($T_1$) and the maximum operating temperature ($T_2$).

If the actual temperature ($T_{ACT}$) of the battery 20 is less than or equal to operating temperature ($T_3$) of the battery 20 then the scaled value state of charge (SOC) and the scaled value temperature ($T_{BATT}$) of the battery 20 are multiplied with the originally requested regeneration ($R_{REQ}$) to determine an actual regeneration ($R_{ACT}$) amount, step 34. The system 22 sends the actual regeneration amount ($R_{ACT}$) to the ECU 16, step 36, for regenerating the battery 20. When the actual temperature ($T_{ACT}$) of the battery 20 is less than or equal to operating temperature ($T_3$) of the battery 20 the regeneration of the battery 20 assists in increasing the battery temperature to the optimal temperature ($T_3$) of the battery 20.

However, if actual temperature ($T_{ACT}$) is greater than operating temperature ($T_3$) of the battery 20 then increasing the temperature of the battery 20 is not desired. The regeneration of the battery 20 will be reduced as a result of the low scaled values for the state of charge (SOC), the scaled value battery temperature ($T_{BATT}$), and the scaled value maximum charging power ($P_{MAX}$). This assists in maintaining the battery 20 in the acceptable operating ranges. In this instance, the scaled value state of charge (SOC), the scaled value battery temperature ($T_{BATT}$), and scaled value maximum charging power ($P_{MAX}$) are multiplied with the originally requested regeneration ($R_{REQ}$) to determine an actual regeneration ($R_{ACT}$) amount, step 38. The system 22 sends the actual regeneration amount ($R_{ACT}$) to the ECU 16, step 36, for recharging the battery 20.

By setting the actual regeneration value ($R_{ACT}$) based upon the state of charge (SOC), the battery temperature ($T_{BATT}$), and the maximum charging power ($P_{MAX}$), the regeneration of the battery 20 may be controlled to maintain the state of charge (SOC) and the battery temperature ($T_{BATT}$) within acceptable operating ranges while still taking advantage of available regeneration power.

Although the embodiment described above includes an electrically variable transmission the regeneration capacity control method taught herein may be utilized with any hybrid vehicle that requires regeneration of the battery and is not intended to be limited to vehicles having electrically variable transmissions.

While the best modes for carrying out the invention have been described in detail, those familiar with the art to which this invention relates will recognize various alternative designs and embodiments for practicing the invention within the scope of the appended claims.

The invention claimed is:

1. A method for controlling regeneration of a battery for a vehicle having an electrically variable transmission comprising:
   determining a scaled value for a state of charge of the battery,
      wherein the scaled value for the state of charge of the battery is proportional to an actual state of charge of the battery when the actual state of charge of the battery is between a first state of charge threshold and a second state of charge threshold,
      wherein the scaled value for the state of charge of the battery is equal to 1.0 when the actual state of charge of the battery is less than the first state of charge threshold; and
      wherein the scaled value for the state of charge of the battery is equal to 0.0 when the actual state of charge of the battery is greater than the second state of charge threshold;
   determining a scaled value for a battery temperature,
      wherein the scaled value for the battery temperature is proportional to an actual battery temperature when the actual battery temperature is between a first temperature threshold and a second temperature threshold,
      wherein the scaled value for the battery temperature is equal to 1.0 when the actual battery temperature is less than the first temperature threshold; and
      wherein the scaled value for the battery temperature is equal to 0.0 when the actual battery temperature is greater than the second temperature threshold;
   calculating an actual regeneration amount by multiplying the scaled value for the state of charge of the battery with the scaled value for the battery temperature and with a requested regeneration value;
   controlling the regeneration of the battery for the vehicle according to the calculated regeneration amount;
   wherein a state of charge range defined by the first state of charge threshold and the second state of charge threshold is greater than an ideal state of charge range for the battery; and
   wherein a battery temperature range defined by the first temperature threshold and the second temperature threshold is greater than an ideal temperature range for the battery.

2. The method of claim 1, further comprising,
   determining a scaled value for a maximum charging power of the battery,
      wherein the scaled value for the maximum charging power of the battery is proportional to an actual charging power available for the battery when the actual charging power available for the battery is between a first power threshold and a second power threshold,
      wherein the scaled value for the maximum charging power of the battery is equal to 1.0 when the actual charging power available for the battery is less than the first power threshold; and
      wherein the scaled value for the maximum charging power of the battery is equal to 0.0 when the actual charging power available for the battery is greater than the second power threshold; and
   comparing the actual battery temperature with a predetermined minimum operating temperature, the predetermined minimum operating temperature being less than the first temperature threshold; and
   wherein calculating the actual regeneration amount further includes multiplying the product of the scaled value for the state of charge of the battery, the scaled value for a battery temperature, and the requested regeneration value with the scaled value for a maximum charging power of the battery when the actual battery temperature is greater than or equal to the predetermined minimum operating temperature.

3. A method for controlling regeneration of a battery:
   providing a requested regeneration amount;
   determining a scaled value for a state of charge of the battery;
   determining a scaled value for a temperature of the battery;
   determining a scaled value for a maximum charging power of the battery;
   comparing an actual battery temperature with a predetermined operating temperature;
   calculating an actual regeneration amount by multiplying the scaled value for the state of charge of the battery, the scaled value for the battery temperature, and the requested regeneration amount, when the actual battery temperature is less than the predetermined operating temperature; and calculating the actual regeneration amount by multiplying the scaled value for the state of charge of the battery, the scaled value for the battery temperature, the scaled value for a maximum charging power of the battery, and the requested regeneration amount, when the actual battery temperature is greater than or equal to the predetermined operating temperature;

controlling the regeneration of the battery for the vehicle according to the calculated regeneration amount;

wherein the scaled value for the state of charge of the battery is proportional to an actual state of charge of the battery when the actual state of charge of the battery is between a first state of charge threshold and a second state of charge threshold, wherein the scaled value for the state of charge of the battery is equal to 1.0 when the actual state of charge of the battery is less than the first state of charge threshold; and wherein the scaled value for the state of charge of the battery is equal to 0.0 when the actual state of charge of the battery is greater than the second state of charge threshold; and wherein a state of charge range defined by the first state of charge threshold and the second state of charge threshold is greater than an ideal state of charge range for the battery.

4. The method of claim 3, wherein the scaled value for the battery temperature is proportional to an actual battery temperature when the actual battery temperature is between a first temperature threshold and a second temperature threshold, wherein the scaled value for the battery temperature is equal to 1.0 when the actual battery temperature is less than the first temperature threshold; and wherein the scaled value for the battery temperature is equal to 0.0 when the actual battery temperature is greater than the second temperature threshold.

5. The method of claim 4, wherein a battery temperature range defined by the first temperature threshold and the second temperature threshold is greater than an ideal temperature range for the battery.

6. The method of claim 4, wherein the predetermined operating temperature is less than the first temperature threshold.

7. The method of claim 3, wherein the scaled value for the maximum charging power of the battery is proportional to an actual charging power available for the battery when the actual charging power available for the battery is between a first power threshold and a second power threshold, wherein the scaled value for the maximum charging power of the battery is equal to 1.0 when the actual charging power available for the battery is less than the first power threshold; and wherein the scaled value for the maximum charging power of the battery is equal to 0.0 when the actual charging power available for the battery is greater than the second power threshold.

8. A method for controlling regeneration of a battery:
providing a requested regeneration amount;
determining a scaled value for a state of charge of the battery;
determining a scaled value for a temperature of the battery;
determining a scaled value for a maximum charging power of the battery;
comparing an actual battery temperature with a predetermined operating temperature;
calculating an actual regeneration amount by multiplying the scaled value for the state of charge of the battery, the scaled value for the battery temperature, and the requested regeneration amount, when the actual battery temperature is less than the predetermined operating temperature; and
calculating the actual regeneration amount by multiplying the scaled value for the state of charge of the battery, the scaled value for the battery temperature, the scaled value for a maximum charging power of the battery, and the requested regeneration amount, when the actual battery temperature is greater than or equal to the predetermined operating temperature; and
controlling the regeneration of the battery for the vehicle according to the calculated regeneration amount;
wherein the scaled value for the battery temperature is proportional to an actual battery temperature when the actual battery temperature is between a first temperature threshold and a second temperature threshold,
wherein the scaled value for the battery temperature is equal to 1.0 when the actual battery temperature is less than the first temperature threshold; and
wherein the scaled value for the battery temperature is equal to 0.0 when the actual battery temperature is greater than the second temperature threshold; and
wherein a battery temperature range defined by the first temperature threshold and the second temperature threshold is greater than an ideal temperature range for the battery.

9. The method of claim 8, wherein a state of charge range defined by the first state of charge threshold and the second state of charge threshold is greater than an ideal state of charge range for the battery.

10. The method of claim 8, wherein the scaled value for the battery temperature is proportional to an actual battery temperature when the actual battery temperature is between a first temperature threshold and a second temperature threshold,
wherein the scaled value for the battery temperature is equal to 1.0 when the actual battery temperature is less than the first temperature threshold; and
wherein the scaled value for the battery temperature is equal to 0.0 when the actual battery temperature is greater than the second temperature threshold.

11. The method of claim 8 wherein the predetermined operating temperature is less than the first temperature threshold.

12. The method of claim 8, wherein the scaled value for the maximum charging power of the battery is proportional to an actual charging power available for the battery when the actual charging power available for the battery is between a first power threshold and a second power threshold,
wherein the scaled value for the maximum charging power of the battery is equal to 1.0 when the actual charging power available for the battery is less than the first power threshold; and
wherein the scaled value for the maximum charging power of the battery is equal to 0.0 when the actual charging power available for the battery is greater than the second power threshold.

* * * * *